United States Patent [19]

Inoue et al.

[11] Patent Number: 5,191,565
[45] Date of Patent: Mar. 2, 1993

[54] OPTICAL INFORMATION RECORDING MEDIUM

[75] Inventors: Kazuo Inoue, Osaka; Takeo Ohta, Nara; Masami Uchida, Hirakata; Kazumi Yoshioka, Yawata; Shigeaki Furukawa, Shiki, all of Japan

[73] Assignee: Matsushita Electric Industrial Co., Ltd., Osaka, Japan

[21] Appl. No.: 713,008

[22] Filed: Jun. 10, 1991

Related U.S. Application Data

[63] Continuation-in-part of Ser. No. 537,947, Jun. 14, 1990.

[30] Foreign Application Priority Data

Jun. 19, 1989 [JP] Japan .................................. 1-156533
Jul. 6, 1989 [JP] Japan .................................. 1-174703

[51] Int. Cl.$^5$ .................................................. G11B 3/70
[52] U.S. Cl. ...................................... 369/284; 369/283; 369/286
[58] Field of Search ............... 369/282, 283, 284, 288, 369/275.1, 275.2, 275.3, 275.4

[56] References Cited

U.S. PATENT DOCUMENTS

| | | | |
|---|---|---|---|
| 3,530,441 | 9/1970 | Ovshinsky . | |
| 4,340,655 | 7/1982 | Hollister et al. | 369/275.5 |
| 4,837,130 | 6/1989 | Ohta et al. | 369/288 |
| 4,839,883 | 6/1989 | Nagata et al. | 369/286 |
| 4,860,274 | 8/1989 | Kobayashi | 369/275.2 |
| 4,866,672 | 9/1989 | Terao et al. | 369/283 |
| 4,900,598 | 2/1990 | Suzuki | 369/288 |
| 4,944,981 | 6/1990 | Oguchi et al. | 369/288 |
| 4,954,379 | 9/1990 | Nishida et al. | 369/288 |

FOREIGN PATENT DOCUMENTS

| | | | |
|---|---|---|---|
| 0239390 | 9/1987 | European Pat. Off. . | |
| 0265204 | 4/1988 | European Pat. Off. . | |
| 0298612 | 1/1989 | European Pat. Off. | 369/283 |
| 0319037 | 6/1989 | European Pat. Off. . | |
| 61-92448 | 5/1986 | Japan . | |
| 63-187435 | 3/1988 | Japan . | |
| 0273233 | 11/1988 | Japan | 369/283 |
| 0302437 | 12/1988 | Japan | 369/283 |
| 0105340 | 4/1989 | Japan | 369/283 |
| 2079031 | 1/1982 | United Kingdom . | |

OTHER PUBLICATIONS

Philip M. Heyman, High Performance Erasable Optical Disc, Proceedings of SPIE, Optical Storage Media, 420, pp. 162-167, 1983.

M. Chen et al., Compound Materials for Reversible, Phase-Change Optical Data Storage, Applied Physics Letters, vol. 49, No. 9, pp. 502-504, 1986.

*Primary Examiner*—Eugene R. LaRoche
*Assistant Examiner*—Tan Nguyen
*Attorney, Agent, or Firm*—Stevens, Davis, Miller & Mosher

[57] ABSTRACT

Disclosed is an optical information recording medium which comprises an active layer which undergoes phase change upon irradiation with light and protective layers formed on both the sides of the active layer, wherein the thermal capacity of the active layer which is a heat source is decreased, a reflection layer of high thermal conductivity is provided on the protective layer to cause increase of the coefficient of lines expansion of the protective layer with increase in distance from the active layer or the thickness of each layer is specified to make nearly the constant maximum temperature by irradiated light against a change in the thickness of the active layer.

14 Claims, 6 Drawing Sheets

IRRADIATION LIGHT

F I G. IA

IRRADIATION LIGHT

F I G. IB

IRRADIATION LIGHT

FIG. 2A

↑↑
IRRADIATION LIGHT

FIG. 2B

↑↑
IRRADIATION LIGHT

OPTICAL INFORMATION RECORDING MEDIUM

This application is a continuation-in-part of application Ser. No. 07/536,947, filed Jun. 14, 1990.

BACKGROUND OF THE INVENTION

1. Field of the Invention

The present invention relates to an optical information recording medium of high memory capacity in which some information is recorded or erased by elevating the temperature of an active layer by irradiation with light such as a laser beam to bring about a phase change.

2. Description of the Prior Art

Since S. R. Ovsinsky et al disclose in U.S. Pat. No. 3,530,441 that thin films of, for example, $Te_{85}Ge_{15}$, $Te_{81}Ge_{15}S_2Sb_2$, and the like undergo a reversible phase change by irradiation with a laser beam or the like, development of optical information recording media in which a chalcogenide alloy thin film is used as an active layer and recording, reproducing and erasing can be carried out, has been hastened.

Regarding the construction of such optical information recording media, UK Patent Application GB 079031A discloses an optical information recording medium of a three-layer construction comprising an active layer comprising a chalcogenide alloy thin film and a reflection layer comprising a metallic thin film having a high light reflectivity such as Au and Al, between which an intermediate layer is inserted. This aims at enhancement of sensitivity by increasing a light absorption rate utilizing the interference effect of light. Furthermore, Heyman et al disclose constructions having an active layer, both sides of which are covered with protective layers (Philip M. Heyman, Proceedings of SPIE, Optical Storage Media, 420, 162 (1983)). Some of them have a reflection layer and the others have no reflection layer. These constructions also utilize the interference of light. However, at present, an active layer comprising a chalcogenide alloy is widely used for retaining the shape of the layer when melted by irradiation with a laser beam. One object for developing this optical information recording medium is to improve the number of rewriting cycles of recording and erasing of information. Japanese Patent Kokai (Laid-Open) No. 61-92448 discloses an optical information recording medium comprising an active layer and a resin substrate, between which is provided an intermediate layer having a coefficient of linear expansion of $1 \times 10^{-5}/k$ or less. This is for inhibition of occurrence of cracks in the active layer owing to linear expansion. Moreover, Japanese Patent Kokai (Laid-Open) No. 63-187435 discloses an optical information recording medium in which a thermally conductive thin film having a higher thermal conductivity than that of the active layer is provided adjacent to the active layer. This is for reducing the difference in temperature at the central part and at the edge portion of a recording track to inhibit thermal damage and to increase the number of rewriting cycles. However, the number of rewriting cycles has still been limited in the conventional optical information recording media. This limitation is due to the generation of pinholes. (See, M. Chen, et al., Applied Physics Letters, 49, 9, 502(1986)). That is, with increase in the number of rewriting cycles, pinholes of several tens of nm in diameter are uniformly generated on the recording track of the optical information recording medium and the pinholes grow with increase of the number of rewriting cycles.

SUMMARY OF THE INVENTION

The object of the present invention is to provide an optical information recording medium in which the generation of pinholes in an active layer at rewriting is inhibited and the number of rewriting cycles is markedly increased.

The above object has been attained by inhibiting the generation of pinholes in an optical information recording medium having protective layers on both the sides of the active layer.

First, the mechanism of generation of pinholes will be explained.

The active layer is heated by light irradiated to the optical information recording medium for recording of information and is melted, but protective layers formed on both sides of the active layer are higher in melting point than the active layer and so is not melted. Since the temperature of the protective layer decreases with increase in distance in the direction of thickness from the active layer side, the protective layer deforms in a convex form in its active layer side. As a result, the materials of the active layer are excluded outside the record mark portion and cannot return upon cooling to produce fine pinholes.

Therefore, according to the present invention, the deformation of the protective layer due to thermal expansion which is the cause for the generation of pinholes is reduced. That is, firstly, the thermal capacity of the active layer is diminished so as to reduce heat source; secondly, a material of a high thermal conductivity is used as a metal reflection layer for the rapid dissipation of heat from the protective layers; and thirdly, the protective layer is to have a bi-layer structure comprising a material of a low thermal expansion coefficient and a material of a high thermal expansion coefficient in order to inhibit the bimetal deformation of the protective layer. Furthermore, there is employed such structure that the temperature of the active layer does not change with change in thickness of the layer in order to inhibit the change of thickness even when the thickness of the active layer becomes locally non-uniform due to the deformation of the protective layer owing to thermal expansion. By employing the above construction, the generation of pinholes is inhibited and the number of rewriting cycles of recording and erasing of information in the optical information recording medium is markedly increased.

DESCRIPTION OF THE PREFERRED EMBODIMENTS

Figure 1A:
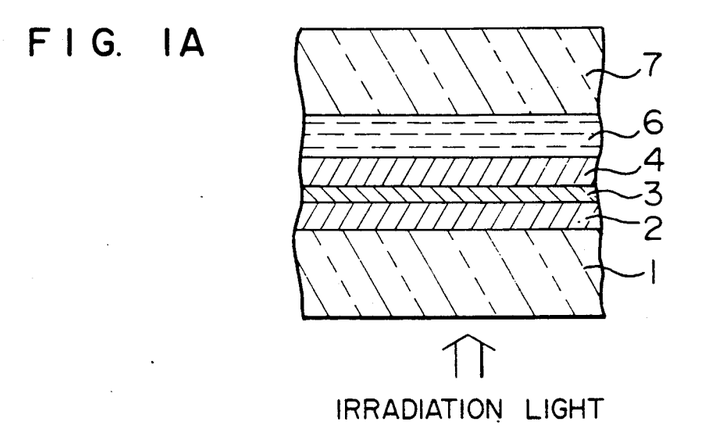
FIG. 1(a) and (b) are cross-sectional views which show the constructions of optical information recording mediums of the first, second, fourth and fifth examples of the present invention.
Figure 1B:
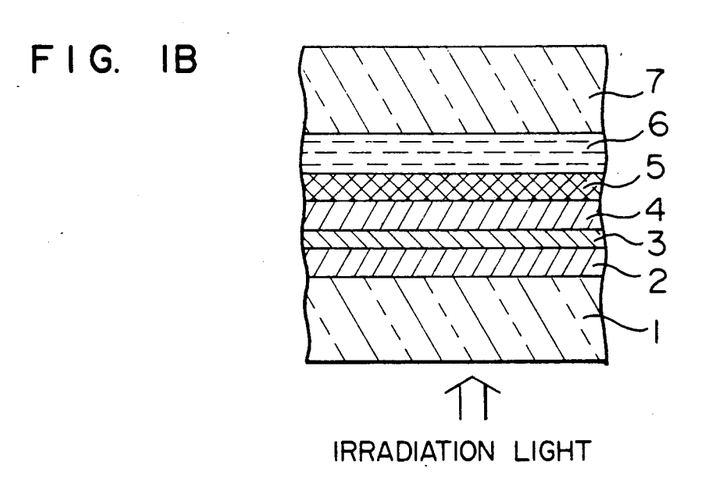

First, some examples of the constructions of the main optical information recording media of the present invention are shown in FIG. 1(a) and (b). In FIG. 1(a), substrate 1 is made of a transparent material such as glass, a polycarbonate resin, or the like. On substrate 1 are laminated first protective layer 2, active layer 3, and second protective layer 4 in succession by a vacuum thin film depositing process such as a sputtering process and the resulting laminate is bonded to protective plate 7 through adhesive 6. In FIG. 1(b), on substrate 1 are laminated first protective layer 2, active layer 3, second protective layer 4 and reflection layer 5 in succession and the resulting laminate is bonded to protective plate 7 through adhesive 6. Protective plate 7 may be made of the same material as that of substrate 1 or a metal which does not transmit light. In the case of FIG. 1, light enters from the side of substrate 1.

The first protective layer 2 and second protective layer 4 serve to inhibit the deformation of substrate 1, adhesive 6 or protective plate 7 due to the elevation of the temperature of active layer 3 caused by irradiation with light.

Furthermore, active layer 3 absorbs energy of a laser beam and once melts in recording of information in the optical information recording medium. Therefore, the melting point of the first protective layer 2 and that of the second protective layer 4 must be higher than that of active layer 3.

Moreover, only the first protective layer 2 in the case of the construction shown in FIG. 1(a) and the first protective layer 2, the second protective layer 4 and the reflection layer 5 in the case of the construction shown in FIG. 1(b) act to increase the amount of reflected light between the different solid states of the active layer which is converted to a recorded information signal by interference of light. Therefore, in order to efficiently supply incident light to active layer 3, first protective layer 2 and second protective layer 4 must have no absorbability for a wavelength of incident light.

As an example of the construction of the optical information recording medium, a single side adhering structure is shown, but it may be a double side adhering structure or a sandwich structure.

Materials for active layer 3 includes, for example, such types as GeTe, GeTeSb, GeTeSn, GeTeSi, GeTeSbSe, GeTeSnZn, BiTe, InSb, InSe, InTe, InSbTe, AsSe, and AsTe. Especially preferred are GeTeSb type materials.

Materials for the protective layers 2,4 include, for example, oxides, nitrides and sulfides of element selected from Si, Al, Ta, Ti, Zn, Sb, Y, Ge, Zr, Sn, Nb, V, Mg, and the like and mixtures of these compounds.

Materials for the reflection layer 5 include, for example, those which are mainly composed of at least one of Ag, Au, Al, Cu, Cr, Ni, Pt and W.

According to the first example of the present invention, calorie supplied to active layer 3 which is a heat source is reduced under the above conditions. When the thermal capacity of active layer 3 is referred to as Ma and that of first protective layer 2 is referred to as $Md_1$, Ma is reduced to less than one-third of $Md_1$.

The thermal capacity is given by the product of density, specific heat and volume. Since the areas of the respective layers are equal, when the thermal capacity, density, specific heat and thickness of layer are referred to as M, $\sigma$, C, and d, respectively, the following relationship results.

$$M \propto \sigma \tag{1}$$

When an elevated temperature is referred to as $\Delta T$, calorie Q accumulated has the following relationship.

$$Q = M\Delta T \tag{2}$$

Active layer 3 absorbs energy upon irradiation with light and acts as a heat source. Therefore, when calorie accumulated in active layer 3 is reduced, the amount of deformation of first protective layer 2 and second protective layer 4 adjacent to active layer 3 caused by thermal expansion can be reduced. However, since the active layer must be once heated to a higher temperature than the melting point at recording of information in active layer 3, it is difficult to decrease $\Delta T$ in the formula (2). Thus, it can be understood that the thermal capacity of active layer 3 may be reduced.

In FIG. 1, the recording and erasing of information in the optical information recording medium is carried out by the irradiation of active layer 3 with a laser beam from the side of substrate 1. Therefore, heat impulse applied to first protective layer 2 is great and heat impulse to second protective layer 4 is small. That is, first protective layer 2 has a larger high-temperature area than second protective layer 4. Therefore, the relationship between the thermal capacity of active layer 3 and first protective layer 2 and the number of rewriting cycles was obtained by experiment.

For such experiment, an optical information recording medium of a quadri-layer structure having a diameter of 130 mm was used. A mixture of ZnS and $SiO_2$ was used for second protective layer 4 and the thickness of the layer was 240 nm. Reflection layer 5 was made of Al and the thickness thereof was 100 nm. Evaluation was carried out by irradiating one laser beam whose spot diameter was stopped-down to 1 $\mu$m to the optical information recording medium rotated at 1800 rpm to overwrite a random pattern signal of (2,7)RLLC of the maximum recording frequency f=3.43 MHz, thereby to measure a bit error rate (BER). This overwriting is a method of simultaneous recording and erasing of information by changing the phase state of active layer 3 to the different phase states corresponding to respective power levels by the power modulation between high power level and low power level. The bit error rate was obtained by bit-by-bit comparing the amount of information to be recorded in the optical information recording medium with the reproduced amount of the recorded information. The number of rewriting cycles was defined to be the number of cycles until the bit error rate reached the order of $10^{-4}$. The bit error rate of the first cycle, namely, the initial value of bit error rate was all, on the order of $10^{-6}$. The results are shown in Table 1.

Active layer 3 is formed of a high-speed crstallizable material which comes crystallized upon irradiation by a laser beam (having characteristics as defined below) for a minimum pulse duration of 90 ns or less, in order to erase amorphous marks already recorded on the optical information recording medium. The recording medium is, e.g., 5.25 inches in diameter and is rotated at 1,800 rpm. The laser beam is, e.g., 1 $\mu$m in spot diameter. The time required to permit a laser beam to pass over one point on a rotating optical information recording medium is shortest at the outermost circumference. For the above-specified recording medium (5.25 inches in diameter, rotating at 1,800 rpm) and laser beam (1 μm in spot diameter), this time is 90 ns or less, preferably 80 ns. Thus the minimum crystallization time of the material of active layer 3 should be 90 ns or less, preferably 80 ns or less. The crystallization time is defined as the period of time for which active layer 3 is retained within a temperature range exceeding the glass-transition temperature of the material forming layer 3 (but not exceeding the melting temperature of the material forming layer 3), in order to achieve crystallization as active layer 3 is irradiated and heated up by the laser beam.

Figure 5:
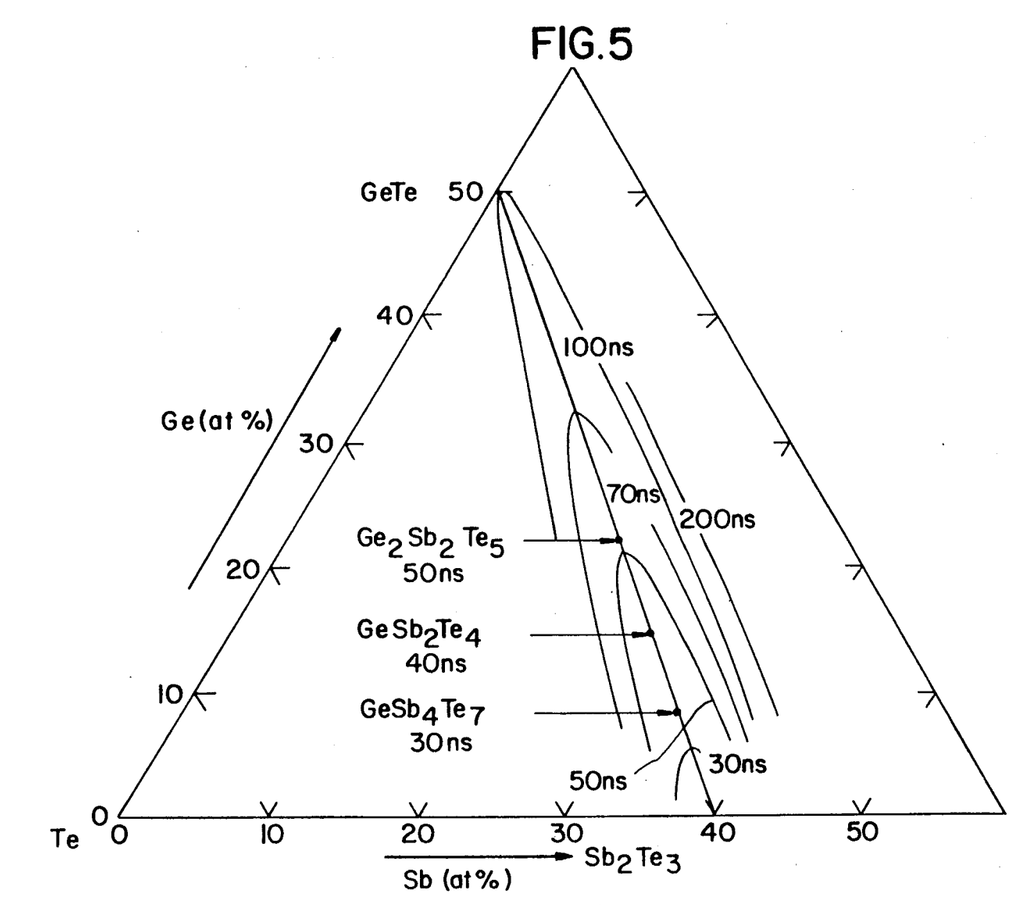
FIG. 5 shows the relationship between the composition and the crystallization time of the material.

For a GeTeSb type active layer material, the relationship between the composition and the crystallization time of the material is shown in FIG. 5. That is, the shortest pulse duration of a laser beam, having a wavelength of 830 nm and a spot diameter of 1 micron, at which crystallization begins to occur, was determined at a set laser power of 8 mW in a static state. The results are shown in FIG. 5. The sample used had a structure including as an active layer of 100 nm thickness sandwiched between ZnS layers formed on a polymethyl methacrylate (PMMA) substrate. From FIG. 5 it is seen maximum temperature which is reached by the active layer during the irradiation, i.e., whether it reaches the glass-transition temperature or the melting temperature. From FIG. 6, it is seen that the active layer can be amorphized within the laser beam application period required to achieve crystallization of the active layer by raising the power of the laser beam. However, the laser beam threshold power at which the active layer is changed from the crystalline to the amorphous phase and vice versa varies depending upon the structural configuration, structural materials and rotational speed of the optical information recording medium. From FIG. 6, it is further seen that the shortest pulse duration for which the active layer is crystallized at a laser beam power higher than 8 mW is shorter than that at a laser power of 8 mW. Thus, the active layer compositional range within which a crystallization time of 90 ns or less is achieved at a laser power higher than 8 mW is broader that the compositional range as shown in FIG. 5 wherein the laser power is fixed at 8 mW. For example, when a GeTeSb type active layer is used in the information recording medium, the compositional range within which the crystallization time is 90 ns or less is broader than that shown in FIG. 5.

TABLE 1

| Material of active layer | Density $\rho_a$ (g/cm$^3$) | Specific heat $C_a$ (J/gK) | Thickness $d_a$ (nm) | $\rho_a C_a d_a$ | Material of first protective layer | Density $\rho_{dl}$ (g/cm$^3$) | Specific heat $C_{dl}$ (J/gK) | Thickness $C_{dl}$ (nm) | $\rho_{dl} C_{dl} d_{dl}$ | The number of rewriting cycles (time) |
|---|---|---|---|---|---|---|---|---|---|---|
| GeSbTe type | 6 | 0.21–0.25 | 15 | 19–23 | ZnS—SiO$_2$ | 3.65 | 0.561 | 100 | 205 | 500,000 |
| | | | 20 | 25–30 | " | " | " | " | " | 700,000 |
| | | | 25 | 32–38 | " | " | " | " | " | 600,000 |
| | | | 30 | 38–45 | " | " | " | " | " | 300,000 |
| | | | 35 | 44–53 | " | " | " | " | " | 80,000 |
| | | | 40 | 50–60 | " | " | " | " | " | 50,000 |
| | | | 50 | 63–75 | " | " | " | " | " | 30,000 |
| | | | 60 | 76–90 | " | " | " | " | " | 10,000 |
| | | | 30 | 38–45 | | " | " | 80 | 164 | 70,000 |
| | | | 30 | 38–45 | | " | " | 120 | 246 | 400,000 |
| | | | 30 | 38–45 | AlN | 3.05 | 0.765 | 140 | 318 | 300,000 |
| | | | 30 | 38–45 | SiO$_2$ | 2.38 | 0.925 | 200 | 440 | 350,000 |
| | | | 30 | 38–45 | ZnS | 4.10 | 0.486 | 140 | 279 | 320,000 |
| | | | 30 | 38–45 | Ta$_2$O$_5$ | 8.20 | 0.307 | 140 | 352 | 350,000 | that it is compositions on the GeTe-Sb$_2$Te$_3$ line which crystallize more quickly, i.e., which require a shorter laser beam pulse duration to achieve crystallization. It is a composition of 0 to 40 at % Ge, 50 to 65 at % Te and 10 to 40 at % Sb which achieves crystallization (upon irradiation by a laser beam having the above-noted characteristics) for a pulse duration of 90 ns or less, where "at %" represents "atomic percent. " Of course, alternative active layer compositions other than the ones noted above may also achieve the requisite crystallization time.

Figure 6:
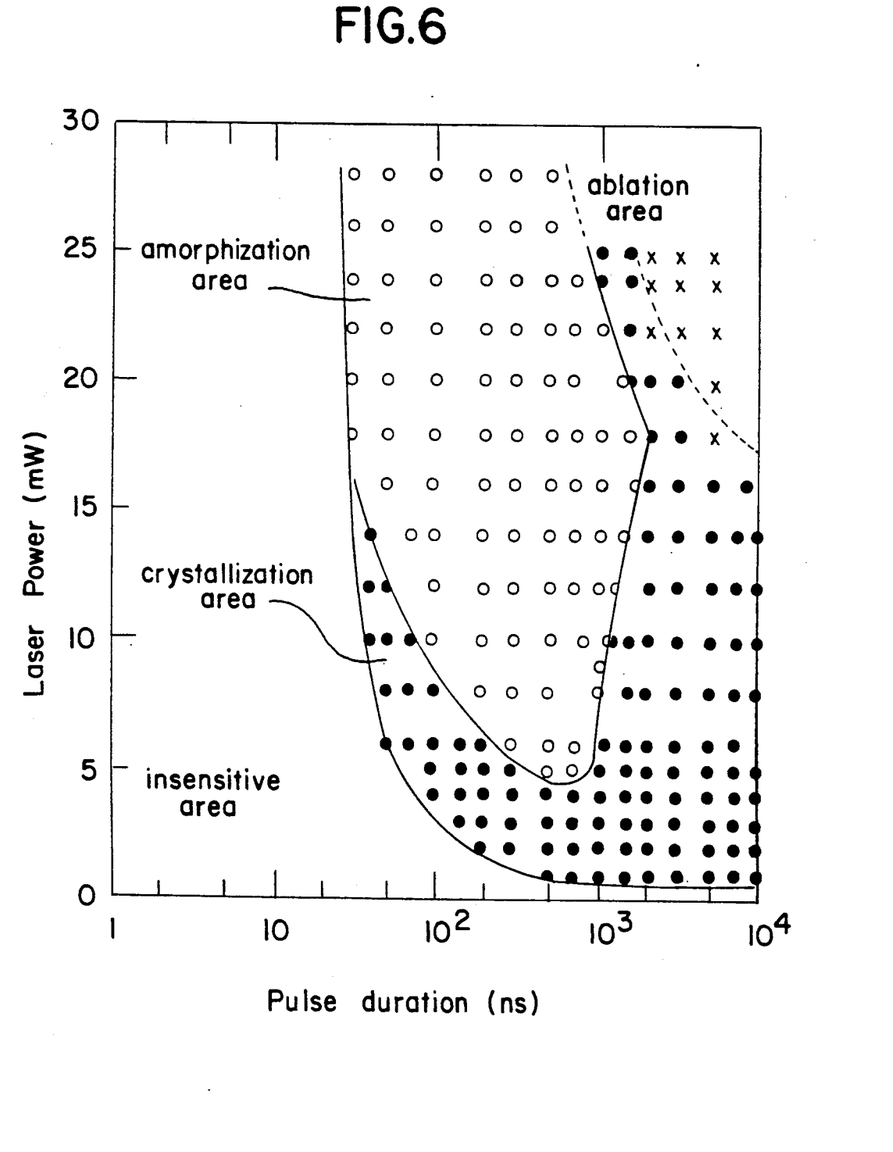
FIG. 6 shows the relationship between the application time and the power of a laser beam in a static state for an active layer.

FIG. 6 shows the relationship between the application time and the power of a laser beam is a static state for an active layer of GeSb$_2$Te$_4$. The sample used comprised layers of ZnS, GeSb$_2$Te$_4$, ZnS and Au laminated on a PMMA substrate in that order, which layers have a thickness of 200 nm, 600 nm, 100 nm, and 20 nm, respectively. The laser beam used had a wavelength of 830 nm and a spot diameter of 1 micron. From FIG. 6, it is seen that the minimum laser beam application time required to achieve crystallization of the active layer is inherent to the material of the active layer. Where the laser beam application time is 90 ns or less, the crystallization of the active layer is effected in a solid phase, and whether the layer becomes amorphized or crystallized when irradiated by the laser beam depends upon the From Table 1, it can be seen that it is when the relation of Ma≦Md$_1$/3 (Ma: thermal capacity of active layer 3 and Md$_1$: thermal capacity of first protective layer 2), preferably Ma≦Md$_1$/4 is satisfied that the number of rewriting cycles reaches 100,000 or more.

On the other hand, the lower limit of thermal capacity Ma of active layer 3 depends on the quantity of signal obtained from the optical information recording medium. Change of reflectivity corresponding to two different phase states in active layer 3 is utilized as an information signal from this optical information recording medium. Therefore, when the thickness of active layer 3 is thinner than 5 nm, the quantity of change of reflectivity in active layer 3 becomes extremely small. When the thermal capacity Ma of active layer 3 and the thermal capacity Md$_1$ of the first protective layer satisfied the relation: Ma<Md$_1$/100, C/N ratio of signal obtained from the optical information recording medium was less than 30 dB.

In accordance with the present invention, the minimization of the heat capacity of active layer 3 can be realized by using a high-speed crstallizable material for active layer 3, because the lower heat capacity of active layer 3 allows active layer 3 not only to be heated for a shorter period of time to achieve the required temperature elevation but also to be cooled for a shorter period of time to lower the temperature as required. As a result, the active layer and the protective layers remain at the induced high temperatures over a shorter period of time. Furthermore, this reduction of the time that these layers remain at the high temperatures allows the volumes of the regions of first and second protective layers 2 and 4, both being retained at the high temperatures, to be reduced, thereby reducing the among of thermal expansion of the protective layers. Thus, the generation of pinholes is prevented.

Table 1 shows the results obtained when the optical information recording media had active layer 3 of Ge-TeSb type, but similar results of increase of the number of rewriting cycles were obtained with optical information recording media having an active layer of chalcogenide alloy such as $Sb_2Te_3$ and GeTe which produces other phase changes.

Next, the second example of the present invention will be explained.

The optical information recording medium has the structure shown in FIG. 1(b). In FIG. 1(b), 1 indicates a substrate and irradiation light enters from the under side of substrate 1. On this substrate 1 are laminated first protective layer 2, active layer 3, second protective layer 4 and reflection layer 5 in succession by a vacuum thin film forming method such as a sputtering method. The resulting laminated structure was bonded to protective plate 7 through adhesive 6.

In the second example, the thermal conductivity of reflection layer 5 of this optical information recording medium is made higher than a certain value.

In this second example, reflection layer 5 of a high thermal conductivity is used as a heat sink and thus, dissipation of heat from active layer 3 through second protective layer 4 is increased. As a result, the elevation of the temperature of first protective layer 2 and second protective layer 4 is inhibited near a recording mark to reduce the amount of deformation of these protective layers towards active layer 3 due to thermal expansion.

Since heat is more rapidly dissipated than in the prior art, the cooling rate adequate to from recorded amorphous marks on active layer 3 can be obtained even if the maximum temperature which active layer 3 reached is slightly higher than the melting temperature of the active layer. Therefore, this maximum temperature can be controlled so as to be lower. In contrast, the critical cooling rate to form recorded amorphous marks on the active layer was obtained in the prior art by making the maximum temperature which the active layer reaches as high as possible to obtain a greater difference from ambient temperatures. For example, with respect to a recording medium including an active layer 3 which is 20 nm thick and made of a Ge-Sb-Te material, a first protective layer 2 with is 140 nm thick and made of a mixture of ZnS and $Sio_2$, a second protective layer 4 made of the same mixture and a reflection layer 5 which is 100 nm thick and made of an aluminum alloy, a comparison was made between the two cases where the thickness of second protective layer 4 is 240 nm and where it is 30 nm. Where the thickness of second protective layer 4 is 240 nm, the cooling rate is 4K/ns even when the maximum temperature is 1,000° C. Where the thickness of second protective layer 4 is 30 nm, the cooling rate is 12K/ns when the maximum temperature is 700° C. On the other hand, the melting temperature of active layer 3 is about 600° C. and the critical cooling rate is 3.5K/ns.

This is because second protective layer 4 acts as heat insulator when it is thicker.

Since the time during which active layer 3 and protective layer 2,4 are at high temperatures above a certain temperature is shortened, the period of time over which the active layer is molten and moved when the amorphous marks are formed is also shortened, so that the active layer is only slightly moved.

Table 2 shown experimental results on the number of requiring cycles when the thermal conductivity of a material and the thickness of reflection layer 5 and the thickness of second protective layer 4 were changed. For the experiment, optical information recording media where used in which an active layer comprised a GeTeSb type material and had a thickness of 20 nm, protective layers comprised a mixture of ZnS and $SiO_2$ and the first protective layer had a thickness of 140 nm. The content of $SiO_2$ was 20 mol %. The bit error rate was measured by overwriting a random pattern signal of (2,7)RLLC of the maximum recording frequency of 3.43 MHz by irradiating a laser beam of 830 nm in wavelength stopped-down to a spot diameter of 1 μm to active layer of the optical information recording medium rotated at 1800 rpm. The bit error rate was obtained by bit-by-bit comparing the amount of information to be recorded in the optical information recording medium with the reproduced amount of the recorded information. The number of rewriting cycles was defined to be the number until the bit error rate reached the order of $10^{-4}$. The initial value was the order of $10^{-6}$.

TABLE 2

| | Reflection layer | | Second protective layer Thickness (nm) | The number of rewriting cycles (time) |
|---|---|---|---|---|
| Material | Thermal conductivity (W/mK) | Thickness (nm) | | |
| Al | 238 | 60 | 30 | 200,000 |
| | | 80 | " | 500,000 |
| | | 100 | " | 700,000 |
| | | 120 | " | 700,000 |
| | | 100 | 20 | 800,000 |
| | | " | 50 | 500,000 |
| | | " | 100 | 300,000 |
| | | " | 150 | 200,000 |
| Au | 319 | 100 | 30 | 700,000 |
| Ag | 428 | " | " | 750,000 |
| Cu | 403 | " | " | 750,000 |
| W | 177 | " | " | 500,000 |
| Mo | 143 | " | " | 400,000 |
| Fe | 83.5 | " | " | 150,000 |

In Table 2, the number of rewriting cycles reached 300,000 when the thickness of the second protective layer was 100 nm, and the thermal conductivity and the thickness of the reflection layer was higher than 100 W/mK and more than 80 nm, respectively.

The thermal conductivity of the reflection layer is preferably 200 W/mK or more.

Moreover, the thermal conductivity of the reflection layer is preferably 500 W/mK or lower. This is because if the thermal conductivity is higher than 500 W/mk, a temperature gradient in the thickness direction of the second protective layer becomes steep and, as a result, the thermal stress applied to the second protective layer increases and exceeds a mechanical strength to cause the formation of cracks in the second protective layer.

When the thickness of the reflection layer is more than 200 nm, the rate of dissipation of heat from the active layer becomes constant. From the standpoint of productivity, a thinner reflection layer is preferred. Thus, the thickness of the reflection layer is preferably less than 200 nm.

Materials for the reflection layer are preferably those which comprise at least one element selected from Ag, Au, Al, Cu, W, Mo, and Zn, more preferably those which comprise at least one element selected from Ag, Au, Al, Cu, and W.

According to an experiment conducted, the thickness of the second protective layer is preferably 100 nm or less, more preferably 50 nm or less. If the thickness of the second protective layer is too thick, the effect of heat dissipating from the active layer through the reflection layer is inhibited. The thickness of the second protective layer is required to be 5 nm or more because sufficient strength to stand thermal stress is necessary. Since the second protective layer is positioned between the active layer which is a heat source and the reflection layer which is a heat sink, the temperature gradient in the thickness direction becomes steep to increase thermal stress applied.

In the above case, the crystallization time of the active layer is 90 ns. The crystallization time is defined as a period of time over which the active layer is retained at a temperature exceeding the glass-transition temperature of the active layer material but not exceeding the melting temperature of the active layer material, in order to achieve crystallization by applying a laser beam to the active layer to covert the active layer from the amorphous form to the crystal form.

The amorphous marks present on an optical information recording medium of 5.25 inches in diameter rotated at 1,800 rpm are erased by a laser beam spot focused to 1 $\mu$m. The shortest period of time for which the laser beam spot is passed over one of the recorded marks to convert the active layer to the crystal form should be 90 ns or less, preferably 80 ns or less.

To an optical information recording medium comprising a polycarbonate substrate, a 20 nm thick active layer of 20 at % Ge, 55 at % Te and 25 at % Sb, two protective layers of 80 mol % ZnS and 20 mol % SiO$_2$, one being 160 nm thick and the other 30 nm thick, and a 100 nm thick reflection layer of aluminum, was applied a laser beam having a wavelength of 830 nm and a spot diameter of 1 micron. An erasing power required for the active layer to be crystallized with a linear speed of 12 m/sec was in the range of 7 mW to 13 mW and the erasing rate was above 20 dB. Furthermore, the recording power forming amorphous marks on the active layer was 16 mW where the laser beam pulse duration was 70 ns. The recording property of the optical information recording medium was adequate within a range from 16 mW to 25 mW, i.e., it exceeds 50 dB.

Next, the third example will be described. The cross-section of the optical information recording medium of this example is shown in FIG. 2(a) and (b).

Figure 2A:
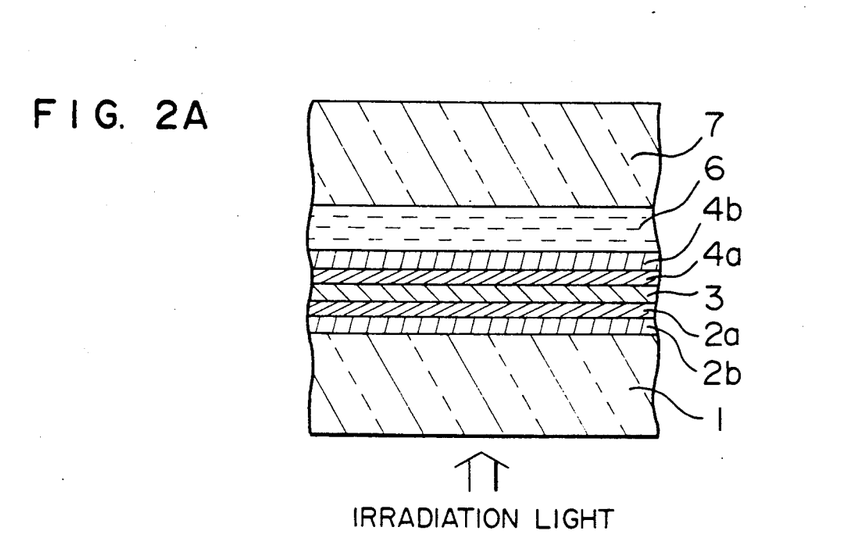
FIG. 2(a) and (b) are cross-sectional views which show the constructions of optical information recording mediums of the third example of the present invention.
Figure 2B:
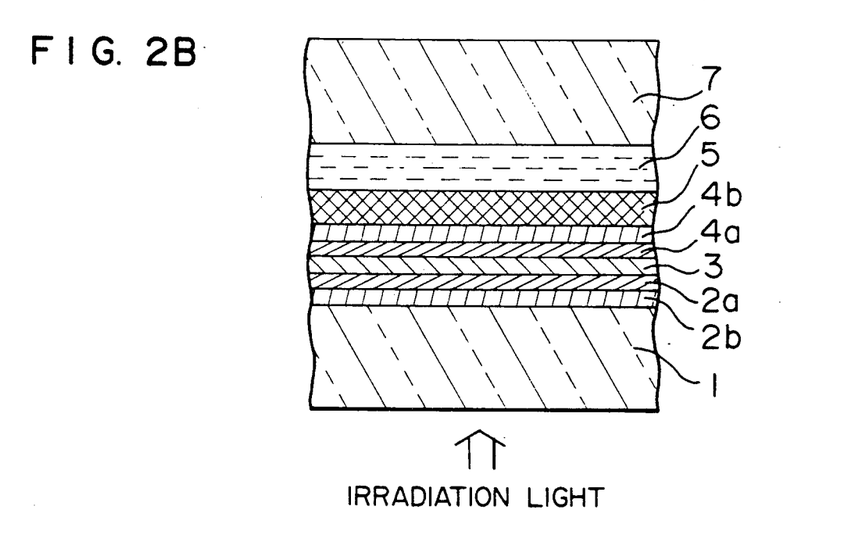

In FIG. 2(a), 1 indicates a substrate comprising polycarbonate resin, glass or the like. On this substrate 1 are successively formed respective layers by a vacuum thin film forming method such as sputtering. First, the first protective layer is formed on substrate 1. This first protective layer comprises low expansion layer 2a and high expansion layer 2b. High expansion layer 2b is formed adjacent to substrate 1 and low expansion layer 2a is formed on the high expansion layer 2b. Active layer 3 is formed on low expansion layer 2a and thereon is formed the second protective layer. The second protective layer has a bi-layer structure and comprises low expansion layer 4a and high expansion layer 4b in this order from the side of active layer 3. Furthermore, protective plate 7 is bonded to high expansion layer 4b through adhesive 6. Recording of information is carried out by irradiating light to active layer 3 from the lower side.

In FIG. 2(b), reflection layer 5 is further formed on high expansion layer 4b of the second protective layer and then the reflection layer 5 is bonded to protective plate 7 through adhesive 6 in FIG. 2(a).

In this way, first protective layers 2a and 2b and second protective layers 4a and 4b are respectively formed of two layers different in coefficient of linear expansion and the protective layers comprising two layers are respectively formed of the layer having a low coefficient of linear expansion on the side of active layer 3 and the layer having a high coefficient of linear expansion on the opposite side. When the temperature of active layer 3 is elevated by irradiation of active layer 3 with light, the deformation of protective layers due to thermal expansion can be inhibited. This is for the following reasons. The amount of thermal expansion $\Delta l$ is given by the product of a thermal expansion coefficient a and change in temperature $\Delta T$. Further, a temperature in the optical information recording medium lowers with increase in distance from active layer 3 in the thickness direction. Therefore, low expansion layer 2a or 4a on the side of active layer 3 is low in a coefficient of thermal expansion and is great in change in temperature $\Delta T$ while high expansion layer 2b or 4b on the opposite side is large in the amount of a thermal expansion a and small in change in temperature $\Delta T$. That is, the amounts of thermal expansion of low expansion layer 2a and high expansion layer 2b of the first protective layer are close to each other or amounts of low expansion layer 4a and high expansion layer 4b of the second protective layer are close to each other. Thus, the bimetal effect is relaxed and the deformation of the first protective layer and the second protective layer on the active layer side in convex form is inhibited. This decreases the amount of the material of the active layer melted by irradiation of light to active layer 3 and forced out by deformation of the first and second protective layers. As a result, generation of pinholes is inhibited to increase the number of rewriting cycles.

As materials for the protective layer of a low coefficient of linear expansion, there are, for example, silicon compounds such as SiO$_2$ of $5.5 \times 10^{-7}$/K, Si$_3$N$_4$ of $3.6 \times 10^{-6}$/K, and SiC of $3.7 \times 10^{-6}$/K. On the other hand, as inorganic materials for the protective layer which have a coefficient of linear expansion of higher than $.5 \times 10^{-6}$/K, there are, for example, ZnS, TiO$_2$, Ta$_2$O$_5$, Y$_2$O$_3$, and ZrO$_2$, which have a coefficient of linear expansion of $7.5 \times 10^{-6}$/K, $7.5 \times 10^{-6}$/K, $7.7 \times 10^{-6}$/K, $8.5 \times 10^{-6}$/K, and $8.8 \times 10^{-6}$/K, respectively.

Materials for the protective layer of a bi-layer structure which are different in coefficient of linear expansion are preferably both inorganic materials because the adhesion between the two protective layers is high and peeling due to shearing force caused by thermal expansion does not occur.

The relationship between the thickness of SiO$_2$ and the number of rewriting cycles when SiO$_2$ was used as the protective layer on the active layer side and ZnS was used as the protective layer on the opposite side is shown in Table 3. In this case, the active layer comprised GeTeSb and had a thickness of 20 nm, the reflection layer comprised Al and had a thickness of 100 nm, the first protective layer had a total thickness of 140 nm, and the second protective layer had a total thickness of 240 nm.

Experiment was conducted by measuring the bit error rate by overwriting a random pattern signal of (2,7)RLLC when the maximum recording frequency reached 3.43 MHz by irradiating a laser beam of 830 nm stopped-down to a spot diameter of 1 μm to the optical information recording medium rotating at 1800 rpm. The bit error rate was obtained by bit-by-bit comparing the amount of information to be recorded in the optical information recording medium with the reproduced amount of the recorded information. The number of rewriting cycles was defined to be the number until the bit error rate reached the order of $10^{-4}$. Rewriting was carried out 1,000,000 times maximum. Initial value was the order of $10^{-6}$.

TABLE 3

| Thickness of $SiO_2$ layer (nm) | The number of rewriting cycles (time) |
| --- | --- |
| 0 | 500,000 |
| 5 | 50,000 |
| 10 | 600,000 |
| 15 | 800,000 |
| 20 | 1,000,000 |
| 25 | 1,000,000 |
| 30 | 1,000,000 |

From Table 3, it is seen that $SiO_2$ is required to have a thickness of 10 nm or more, preferably 20 nm or more. That is, the thickness of the low expansion layer of the protective layer of bi-layer structure on the active layer side is 10 nm or more, preferably 20 nm or more. The thickness of this low expansion layer is preferably 50 nm or less. The first protective layer and the second protective layer are adjacent to the active layer and, hence, function to adjust the amount of heat conduction from the active layer and this amount of heat conduction affects the amount of energy of irradiation light introduced at the time of recording and erasing of information in an optical information recording medium. Therefore, in order to optionally select the amount of heat conduction of the first and second protective layers having a bi-layer structure of low and high expansion layers, the first and second protective layers must undergo influences of not only the heat conduction characteristics of the low expansion layer on the active layer side, but also those of the high expansion layer on the opposite side. From the experiments it is seen that when the thickness of the low expansion layer of each protective layer is more than 50 nm, the same results are obtained as when the protective layer is of a mono-layer structure comprising only material of the low expansion layer.

In experiments the results of which are shown in Table 3, second protective layer 4 was thick, namely, it had a thickness of 240 nm. Alternatively, it can be then, namely, it can have a thickness of 30 nm. Moreover, in Table 3, first protective layers 2a and 2b and second protective layers 4a and 4b were both of a bi-layer structure, but at least the first protective layers 2a and 2b which undergo much heat impulse may be of a bi-layer structure.

Active layer 3 should be made of a material having a crystallization time of 90 ns or less, preferably 80 ns or less. The amorphous marks present on an optical information recording medium which is 5.25 inches in diameter rotated at 1,800 rpm are erased by a laser beam spot focused to 1 μm. The amorphous marks should be crystallized for the shortest period of time allowing the laser beam spot to pass over one of the amorphous marks, i.e., 90 ns or less. In such case, the active layer is exposed to high temperatures for a shorter period of time, whereby the volume of the high-temperature regions in the optical information recording medium is reduced. For example, the volume of the regions of active layer 3 heated to a temperature exceeding the glass-transition temperature of the layer is reduced by one-half, if the laser beam-application time is reduced by one-half. Thus, deformation of the protective layers due to thermal expansion is prevented, so that the generation of pinholes, which would act to limit the possible number of rewriting cycles, can be prevented.

Next, the fourth example will be explained. The structure of the optical information recording medium is as shown in FIG. 1(a) and (b). That is, in FIG. 1(a), on substrate 1 are laminated first protective layer 2, active layer 3, and second protective layer 4 in this order from the side of light irradiation and the resulting laminate is bonded to protective plate 7 through adhesive 6. In FIG. 1(b), reflection layer 5 is further laminated on the second protective layer 4 and this is bonded to protective plate 7 through adhesive 6, being different from the optical information recording medium shown in FIG. 1(a).

In the third example, the bimetal deformation of the protective layer caused when active layer 3 was heated by irradiation of light was inhibited by employing protective layer 2 of a bi-layer structure while in the fourth example, a coefficient of linear expansion in thickness direction is changed continuously by continuously changing a composition in thickness direction without employing any protective layer of a bilayer structure. Specifically, the coefficient of linear expansion of the protective layer is made smaller on the active layer side and is increased with distance from the active layer side.

For example, a mixed material of ZnS and $SiO_2$ is used as protective layer and the composition is continuously changed with an $SiO_2$ content in the active layer side being 30 mol % and an $SiO_2$ content in the opposite side being 15 mol %. As a method for the formation of this protective layer, there is a co-sputtering method in which separate targets are provided for ZnS and $SiO_2$ and a compositional ratio is controlled by adjusting the deposition rates of ZnS and $SiO_2$ by controlling a power to be applied. An optical information recording medium was prepared which was comprised of an active layer of GeTeSb type having a thickness of 20 nm, a reflection layer of Al having a thickness of 100 nm, the first protective layer having a thickness of 140 nm and the second protective layer having a thickness of 240 nm and the bit error rate was measured to find that the number of rewiring cycles was more than 1,000,000. The bit error rate was measured by using a random pattern signal of (2,7) RLLC in case of the maximum recording frequency racing 3.43 MHz when the optical information recording medium was rotated at 1800 rpm and a laser beam of 830 nm in wavelength with a spot diameter of 1 μm was converged onto the active layer. The bit error rate was obtained by bit-by-bit comparing the amount of information to be recorded in the optical information recording medium with the recorded amount of the recorded information.

Active layer 3 should be made of a material having a crystallization of 90 ns or less, preferably 80 ns or less.

The amorphous marks present on an optical information recording medium of 5.25 inches in diameter rotated at 1,800 rpm are erased by a laser beam spot focused to 1 μm. The amorphous marks should be crystallized for the shortest period to time allowing the laser beam spot to pass over one of the amorphous marks, i.e., 90 ns or less. In such case, the active layer is exposed to high temperatures for a shorter prior of time, whereby the volume of the high-temperature regions in the optical information recording medium is reduced. Thus, the deformation of the protective layers due to thermal expansion is prevented, so that the generation of pinholes, which would otherwise limit the possible number of requiring cycles, can be prevented.

A material for the protective layer may be a mixture of a zinc chalcogenide other than ZnS such as ZnSe or ZnTe with $SiO_2$.

The fifth example of the present invention will be example. The structure of the optical information recording medium is as shown in FIG. 1(b). That is, in FIG. 1(b), from the side of irradiation with light, there are substrate 1 and, laminated thereon, first protective layer 2, active layer 3, second protective layer 4, and reflection layer 5 and this is bonded to protective layer 7 through adhesive 6. In this example, even when the thickness of active layer 3 is not constant, the maximum temperature of active layer 3 is made constant.

The thick portion of active layer 3 is larger in thermal capacity and the thin portion is small in thermal capacity. Therefore, when the same energy is supplied to active layer 3, the thick portion is low in the maximum temperature and the thin portion is high in the maximum temperature. Therefore, when a recording light enters into active layer 3, a temperature distribution in active layer 3 becomes non-uniform in the direction of the recording track. Furthermore, in the thinner portion of active layer 3, the material of the active layer melts for a longer time and so the material easily moves. Thus, the thin portion of active layer 3 further becomes thinner and non-uniformity in the thickness of active layer 3 is further conspicuous. On the other hand, in this example, even if the thickness of active layer 3 is not constant, the maximum temperature of active layer 3 is nearly constant and so non-uniformity in the thickness of active layer 3 does not becomes higher.

Next, a method for making the maximum temperature of the active layer nearly constant against the changing of the thickness of active layer 3 will be explained.

When an energy of irradiation light is referred to as Q, absorption rate of light of active layer 3 is referred to as a, thermal capacity of active layer 3 is referred to as Ma, and change in temperature is referred to as $\Delta T$, there is the following relation in stationary state.

$$AQ = Ma\Delta T \quad (3)$$

Since energy supplied by irradiated light does not change and the maximum temperature of active layer 3 is also made constant, Q=constant and $\Delta T$=constant and from the relation of formula (1), $$A \propto da \quad (4)$$

Therefore, although the actual phenomenon is in a non-stationary state where heat diffuses, it is desired as an optical information recording medium to have such a structure that the light absorption rate increases with increase in the thickness of the active layer.

Specific materials and optical properties of the optical information recording medium will be explained.

An optical information recording medium is considered in which substrate 1 comprises a polycarbonate resin, material of active layer 3 is of GeTeSb type and the material of reflection layer 5 is an Al alloy. The polycarbonate resin has a complex refractive index (n, k) of 1.58, 0), the active layer before and after recording has (5.7, 3.4) and (4.9, 1.4), respectively and the reflection layer has (1.9, 6.9) for wavelength $\lambda = 830$ nm. The complex refractive index of first protective layer 2 and that of second protective layer 4 are identical and (2.0, 0). The thickness of active layer 3 is 20 nm and that of the reflection layer is 100 nm.

Figure 3A:
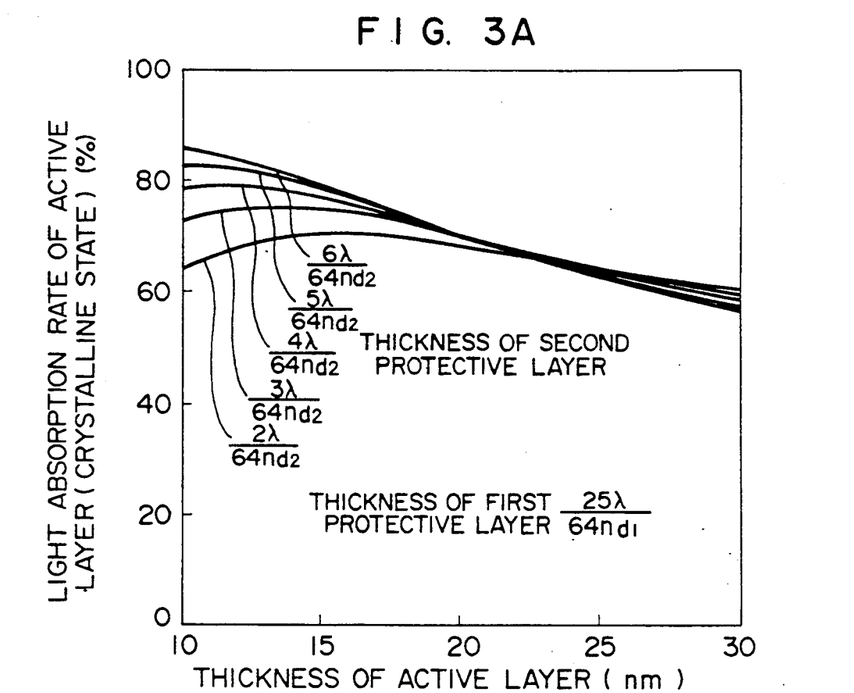
FIG. 3(a) and (b) and FIG. 4(a) and (b) show a relation between the light absorption rate and thickness of the active layer of the optical information recording medium of the fifth example of the present invention.
Figure 3B:
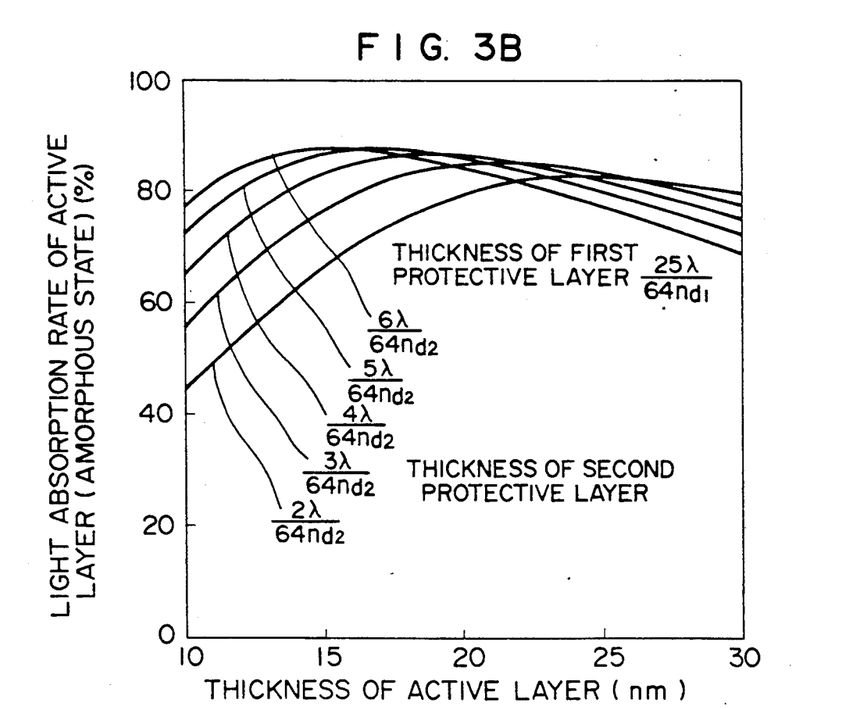
Figure 4A:
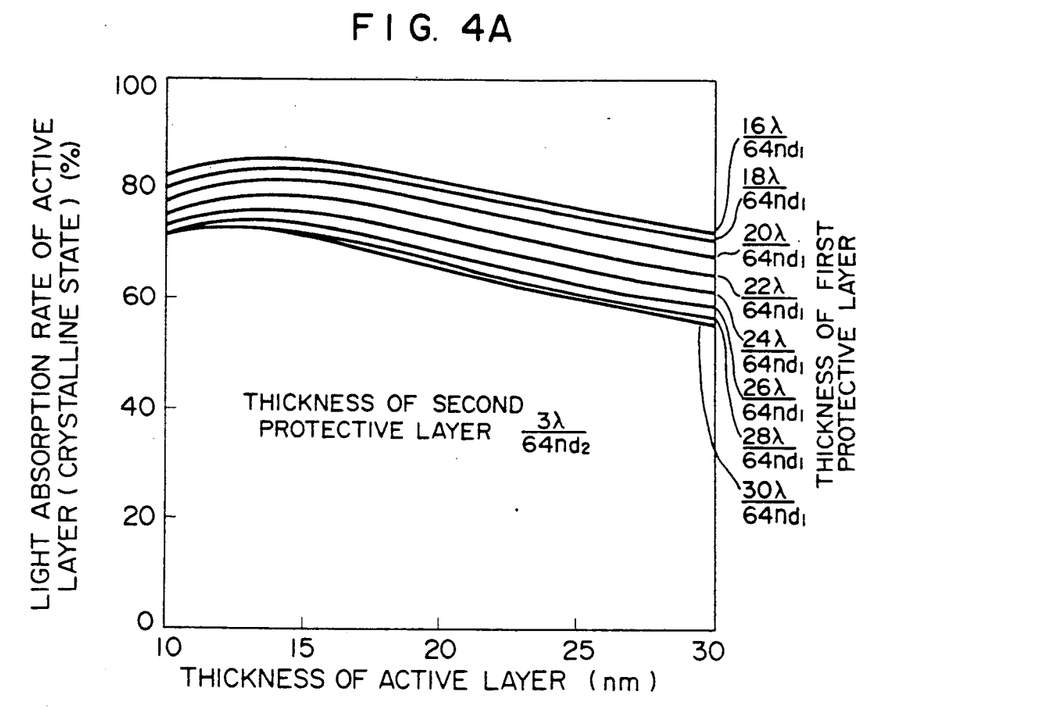
Figure 4B:
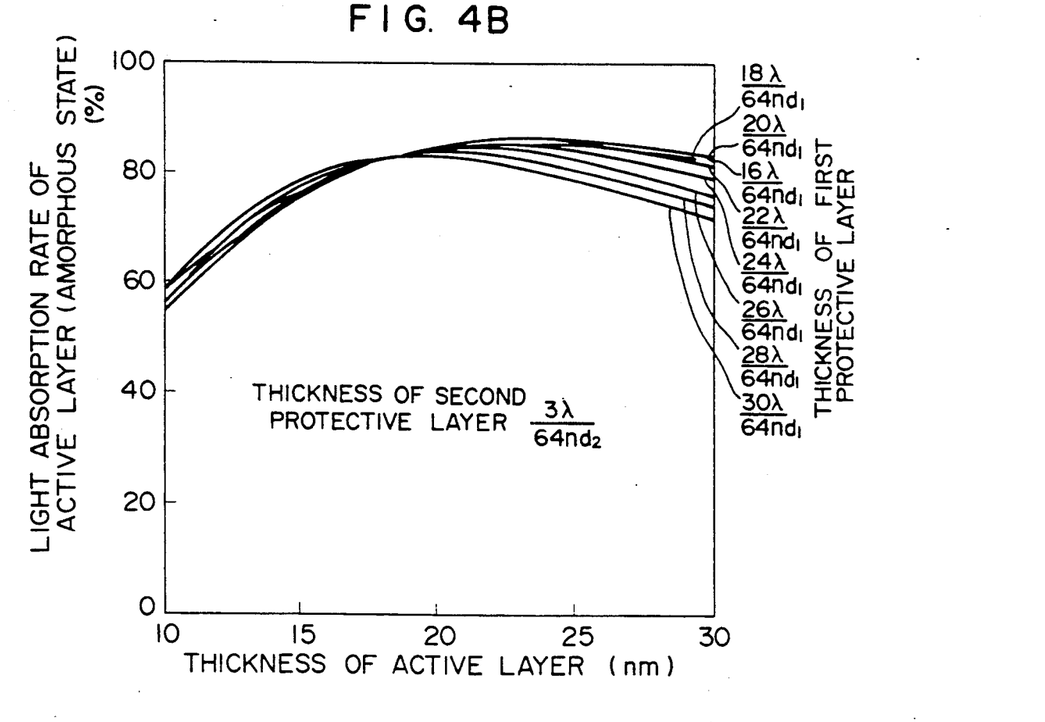

FIGS. 3(a), (b) and FIGS. 4(a), (b) show the relationship between the light absorption rate and thickness of the active layer where the refractive index of first protective layer 2 is indicated by $n_{d1}$, the refractive index of second protective layer 4 is indicated by $n_{d2}$, and the wavelength of recording light is indicated by $\lambda$. Parameters in FIG. 3(a), (b) are the thickness of second protective layer 4 and the thickness of first protective layer 2 is constant of $25\lambda/64n_{d1}$. Parameters in FIG. 4(a), (b) are the thickness of first protective layer 2 and the thickness of second protective layer 4 is constant of $3\lambda/64n_{d2}$. FIG. 3(a) and FIG. 4(a) show the case where the active layer is in a crystalline state and FIG. 3(b) and FIG. 4(b) show the case where the active layer is in an amorphous state.

Table 4 shows a relation between the thickness of first protective layer 2 and second protective layer 4 and the number of rewriting cycles when a mixture of ZnS and $SiO_2$ is used as the material for these protective layers. The content of $SiO_2$ is 20 mol %.

It is seen from Table 4 that it is when the thickness of first protective layer 2 is in the range of $20\lambda/64n_{d1}$ to $27\lambda/64n_{d1}$ and the thickness of second protective layer 4 is $5\lambda/64n_{d2}$ or less that the number of rewriting cycles is more than 500,000. Second protective layer 4 must have $\lambda/64n_{d2}$ or more for the inhibition of mutual diffusion between active layer 3 and reflection layer 5.

TABLE 4

| Thickness of first protective layer ($x\lambda/64n_{d1}$) | Thickness of second protective layer ($x\lambda/64n_{d2}$) | The number of rewriting cycles (time) |
|---|---|---|
| 15 | 3 | 150,000 |
| 18 | " | 350,000 |
| 20 | " | 700,000 |
| 25 | " | 1,000,000 |
| 27 | " | 700,000 |
| 30 | " | 400,000 |
| 25 | 2 | 1,000,000 |
| " | 3 | 1,000,000 |
| " | 4 | 850,000 |
| " | 5 | 650,000 |
| " | 6 | 400,000 |

Similar experiments were conducted with fixing the thickness of first protective layer 2 at $25\lambda/64n_{d1}$, and that of second protective layer 4 at $3\lambda/64n_{d2}$ and changing the initial thickness of active layer 3 to find that the bit error rate was in the order of $10^{-6}$ or $10^{-5}$ even if the number of rewriting cycles was 1,000,000 at a thickness of active layer 3 of 18–25 nm. Measurement of this bit error rate was conducted by overwriting the optical information recording medium with a random pattern signal of (2,7)RLLC when the maximum recording frequency reaches 3.43 MHz by irradiating the active layer of the optical information recording medium rotated at 1800 rpm with a laser beam of 830 nm stopped-down to a spot diameter of 1 μm. The bit error rate was obtained by bit-by-bit comparing the amount of information to be recorded in the optical information recording medium with the reproduced amount of the recorded information.

The crystallization time of active layer 3 used in the present invention should be 90 ns or less in order to erase the recorded amorphous marks present on an optical information recording medium of 5.25 inches in diameter rotated at 1,800 rpm. The time required to allow a laser beam spot focused to 1 μm in diameter to pass over one of the marks is shortest at the outermost circumference of the recording medium and should be 90 ns. The crystallization time is defined as a period of time for which the active layer 3 is retained at a temperature exceeding the glass-transition temperature of the layer material but not exceeding the melting temperature of the layer material, in order to achieve crystallization by applying the laser beam to at the active layer.

The use of a material having a crystallization time as discussed above as active layer 3 enables protective layer 4 to be made thinner, which facilitates heat transfer from active layer 3 to reflection layer 5. As a result, as shown in the second example, the cooling rate can be above the critical value as the maximum temperature of active layer 3 is slightly higher than the melting temperature of the active layer when the marks are formed on active or 3. Furthermore, since the time during which the active layer reaches the maximum temperature and the volume of the region reading the maximum temperature are reduced, the amount of the molten active layer which is moved is reduced, so that the generation of pinholes is prevented.

When the thickness of the reflection layer is 80 nm or more, the light absorption rate in the active layer is saturated. Therefore, the thickness of the reflection layer is preferably 80 nm or more. The thickness of the reflection layer of 200 nm or less is sufficient. This is because the action of the reflection layer to take heat from the active layer or protective layer saturates at a thickness of 200 nm or more.

Materials for the protective layer preferably have a refractive index of about 2 or more. This is in order to obtain a change in quantity of reflected light corresponding to a change of the phase state of the active layer utilizing the interference effect of light at the first protective layer between substrate and active layer and the substrate. For this purpose, the refractive index of the protective layer must differ from that of the substrate. The materials for the protective layer include those which are mainly composed of ZnS, $Sb_2S_3$, CdS, ZnSe, ZnTe, $Si_3N_4$, AlN, SiC, $Bi_2O_3$, $CeO_2$, $Cr_2O_3$, $GeO_2$, $Nd_2O_3$, $Sb_2O_3$, $SnO_2$, TiO, $TiO_2$, $WO_2$, and $ZrO_2$. Preferred are those which are mainly composed of ZnS, ZnSe, ZnTe, $Si_3N_4$, AlN, and SiC.

What is claimed is:

1. An optical information recording medium, comprising an active layer which undergoes a base change upon irradiation with light; and protective layers which are formed on both sides of the active layer, which have a higher melting point than that of the active layer and which show no absorption at the wavelength of the irradiated light, wherein the thermal capacity Ma of the active layer and the thermal capacity $Md_1$ of the protective layer on the side to be irradiated with light have the following relationship: $Ma \leq Md_1/3$, and said active layer has a characteristic such that its minimum cyrstallization time is 90 ns or less.

2. An optical information recording medium according to claim 1, wherein the material of the active layer is mainly composed of GeTeSb type material.

3. An optical information recording medium, comprising an active layer which undergoes a phase change upon irradiation with light; protective layers which are formed on both sides of the active layer, which have a higher melting point than that of the active layer and which show no absorption at the wavelength of the irradiated light; and a reflection layer which is formed on the one of said protective layers located on the side of the active layer opposite the side to be irradiated with light and which reflects back the light to the active layer, said active layer having a characteristics such that its minimum crystallization time is 90 ns or less, said one of said protective layers disposed on the side of the active layer opposite the side to be irradiated with light having a thickness of 100 nm or less, said reflection layer having a thickness of 80 nm or more, and said reflection layer having a thermal conductivity of 100 W/m·k or more.

4. An optical information recording medium according to claim 3, wherein the material of the reflection layer comprises at least one element selected from the group consisting of Ag, Au, Al, Cu, and W.

5. An optical information recording medium according to claim 3, wherein the protective layer formed on the active layer on the side opposite the side to be irradiated with light has a thickness of 100 nm or less.

6. An optical information recording medium, comprising an active layer which undergoes a phase change upon irradiation with light; and protective layers which are formed on both sides of the active layer, which have a higher melting point than that of the active layer and which show no absorption at the wavelength of the irradiated light, wherein at least the one of the protective layers disposed on the side of said active layer to be irradiated with light is of a bi-layer structure and a coefficient of linear expansion of a layer of the bi-layer positioned adjacent the active layer is smaller than that of another layer of the bi-layer structure, and said active layer has a characteristic such that its minimum crystallization time is 90 ns or less.

7. An optical information recording medium according to claim 6, wherein the material of the layer which constitutes the protective layer of a bi-layer structure and which is on the side of that active layer comprises a silicon compound.

8. An optical information recording medium according to claim 6, wherein the layer which constitutes the protective layer of a bi-layer structure and which is on the side of the active layer has a thickness of 10 nm or more.

9. An optical information recording medium, comprising an active layer which undergoes a phase change upon irradiation with light; and protective layers which are formed on both sides of the active layers, which have a higher melting point than that of the active layer and show no absorption at the wavelength of the irradiated light, wherein said active layer has a characteristic such that its minimum crystallization time is 90 ns or less and at least the one of said protective layers which is formed on the side of said active layer to be irradiated with light has a coefficient of linear expansion which varies such that it is lowest closest to the active layer and continuously increases with increase in distance from the active layer.

10. An optical information recording medium according to claim 9, wherein the material of the protective layer comprises a mixture of $SiO_2$ and at least one member selected from the group consisting of ZnS, ZnSe and ZnTe.

11. An optical information recording medium, comprising an active layer which undergoes a phase change upon irradiation with light; protective layers which are formed on both sides of the active layer, which have a higher melting point than that of the active layer and which show no absorption at the wavelength of the irradiated light, wherein said active layer has a characteristic such that its minimum crystallization time is 90 ns or less; and a reflection layer which is formed on the one of said protective layers disposed on the side of said active layer opposite the side to be irradiated with light and which reflects back the light to the active layer, the thickness of the other one of said protective layers disposed on the side of said active layer to be irradiated with light being $20\lambda/64n_{d1}$ to $27\lambda/64n_{d1}$ and the thickness of said one of said protective layers disposed on the side of said active layer opposite to the side to be irradiated with light being $\lambda/64n_{d2}$ to $5\lambda/64n_{d2}$, wherein $\lambda$ represents the wavelength of the irradiated light, $n_{d1}$ represents the refractive index of said other one of said protective layers and $n_{d2}$ represents the refractive index of said one of said protective layers.

12. An optical information recording medium according to claim 11, wherein the active layer has a thickness of 18–25 nm.

13. An optical information recording medium according to claim 11, wherein the reflection layer has a thickness of 80 nm or more.

14. An optical information recording medium according to claim 11, wherein the material of the active layer is mainly composed of a GeTeSb type material.

* * * * *